(12) United States Patent
Ali et al.

(10) Patent No.: US 7,911,780 B2
(45) Date of Patent: Mar. 22, 2011

(54) METHODS AND APPARATUS FOR COOLING ELECTRONIC DEVICES THROUGH USER INTERFACES

(75) Inventors: Ihab A. Ali, Santa Clara, CA (US); Bernard K. Rihn, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 12/241,009

(22) Filed: Sep. 29, 2008

(65) Prior Publication Data
US 2010/0053883 A1 Mar. 4, 2010

Related U.S. Application Data

(60) Provisional application No. 61/093,103, filed on Aug. 29, 2008.

(51) Int. Cl.
*G06F 1/16* (2006.01)
(52) U.S. Cl. ......... 361/679.47; 361/679.08; 361/679.46; 361/690; 361/692; 165/80.3; 165/80.4; 165/104.33; 165/104.34
(58) Field of Classification Search ............. 361/679.08, 361/679.5, 692, 693; 341/22
See application file for complete search history.

(56) References Cited

U.S. PATENT DOCUMENTS

| | | | | |
|---|---|---|---|---|
| 5,251,096 | A * | 10/1993 | Hosoi et al. | 361/695 |
| 6,157,537 | A * | 12/2000 | Cheng | 361/699 |
| 6,253,838 | B1 * | 7/2001 | Fiechter et al. | 165/104.33 |
| 6,327,144 | B1 * | 12/2001 | May | 361/679.47 |
| 6,859,364 | B2 * | 2/2005 | Yuasa et al. | 361/679.54 |
| 7,164,580 | B2 * | 1/2007 | DiStefano | 361/679.49 |
| 2002/0085350 | A1 * | 7/2002 | Ghosh | 361/687 |
| 2004/0190243 | A1 * | 9/2004 | DiStefano | 361/687 |
| 2005/0093721 | A1 * | 5/2005 | Shipman | 341/22 |
| 2005/0111189 | A1 * | 5/2005 | Smalc et al. | 361/700 |
| 2006/0227503 | A1 * | 10/2006 | Ho et al. | 361/687 |

* cited by examiner

*Primary Examiner* — Lisa Lea-Edmonds
*Assistant Examiner* — Anthony Q Edwards
(74) *Attorney, Agent, or Firm* — Kramer Levin Naftalis & Frankel LLP

(57) ABSTRACT

An electronic device can be provided with a user interface component and a cooling component contained within a housing. The housing may include at least one surface having an opening formed therethrough, and the user interface may include one port formed therethrough. The user interface port may provide at least a first portion of a passageway between the housing opening and the cooling component. The passageway may allow fluids to be exchanged between the cooling component and the housing opening for cooling the electronic device.

24 Claims, 6 Drawing Sheets

U.S. 7,911,780 B2

METHODS AND APPARATUS FOR COOLING ELECTRONIC DEVICES THROUGH USER INTERFACES

CROSS-REFERENCE TO RELATED APPLICATION

This claims the benefit of U.S. Provisional Patent Application No. 61/093,103, filed Aug. 29, 2008, which is hereby incorporated by reference herein in its entirety.

FIELD OF THE INVENTION

This can relate to methods and apparatus for cooling an electronic device, and, more particularly, to methods and apparatus for cooling an electronic device through a user interface of the electronic device.

BACKGROUND OF THE DISCLOSURE

As electronic components of various electronic devices (e.g., laptop computers) evolve into faster and more dynamic machines, their power requirements often consequently increase. With this increase in power consumption, an increase in power dissipation in the form of heat results. For example, in a laptop computer, chipsets and microprocessors, such as central processing units ("CPUs") and graphics processing units ("GPUs"), are major sources of heat. Heat dissipation is an important consideration in the design of such electronic devices. If this heat is not adequately dissipated, the electronic components may fail and/or cause damage to the electronic device.

Accordingly, what is needed are methods and apparatus for cooling an electronic device.

SUMMARY OF THE DISCLOSURE

Apparatus and methods for cooling an electronic device are provided.

According to one embodiment of the invention, there is provided an electronic device that may include a housing having a housing opening, a cooling component at least partially contained within the housing, and an input/output ("I/O") component at least partially contained within the housing. The I/O component may include a first port through the I/O component for providing a first portion of a passageway between the housing opening and the cooling component.

According to another embodiment of the invention, there is provided an electronic device that may include a housing having a housing opening, a cooling component, and a user interface component. The user interface component may include means for providing fluid communication through the user interface component and between the housing opening and the cooling component.

According to yet another embodiment of the invention, there is provided a method for cooling an electronic device, wherein the electronic device may include a housing having a housing opening, a cooling component, and an input/output ("I/O") component having a port through at least a portion of the I/O component. The method may include passing a fluid between the housing opening and the cooling component through the port. The passing may include discharging the fluid from the cooling component and through the port to the housing opening. Alternatively or additionally, the passing may include drawing the fluid from the housing opening and through the port to the cooling component.

According to yet still another embodiment of the invention, there is provided a method of manufacturing an electronic device. The method may include providing an opening in a surface of a housing and providing a port through a user interface component. The method may also include positioning a cooling component and the user interface component within the housing such that the port provides an airflow passageway between the opening and the cooling component.

BRIEF DESCRIPTION OF THE DRAWINGS

The above and other features of the invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for cooling an electronic device are provided and described with reference to FIGS. 1-7.

Figure 1:
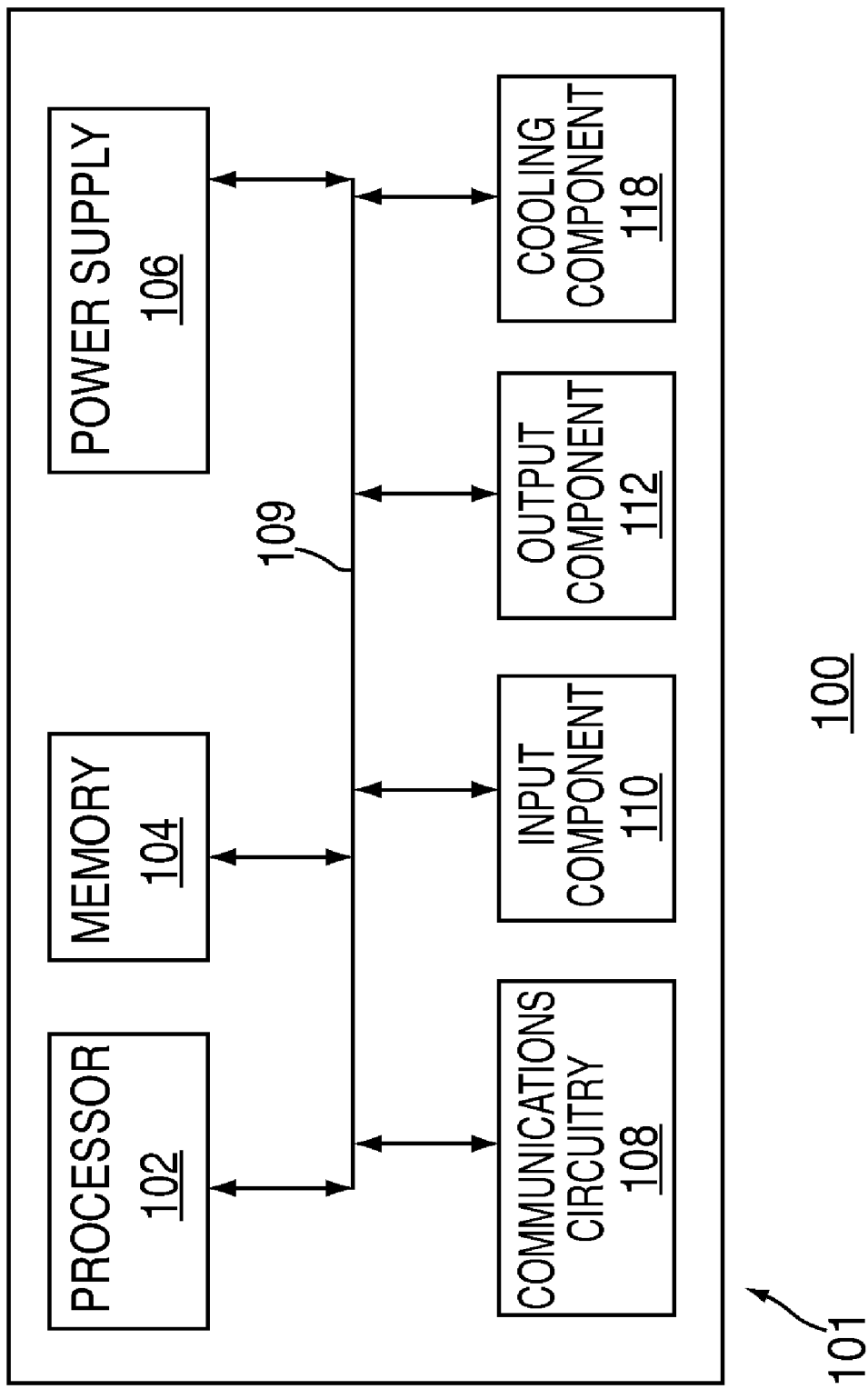
FIG. 1 shows a simplified schematic diagram of an electronic device, according to some embodiments of the invention.

FIG. 1 is a simplified schematic diagram of an electronic device 100 in accordance with one embodiment of the invention. The term "electronic device" can include, but is not limited to, music players, video players, still image players, game players, other media players, music recorders, video recorders, cameras, other media recorders, radios, medical equipment, domestic appliances, transportation vehicle instruments, musical instruments, calculators, cellular telephones, other wireless communication devices, personal digital assistants, remote controls, pagers, computers (e.g., desktops, laptops, tablets, servers, etc.), monitors, televisions, stereo equipment, set up boxes, set-top boxes, boom boxes, modems, routers, keyboards, mice, speakers, printers, and combinations thereof.

As shown in FIG. 1, electronic device 100 may include housing 101, processor 102, memory 104, power supply 106, communications circuitry 108, bus 109, input component 110, output component 112, and cooling component 118. Bus 109 may provide a path for transmitting data and/or power, to, from, or between various components of electronic device 100 including, for example, processor 102, memory 104, power supply 106, communications circuitry 108, input component 110, output component 112, and cooling component 118.

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, microphone, camera, video recorder, and any combinations thereof. Each input component 110 may be configured to provide one or more dedicated control functions for making selections or issuing commands associated with operating device 100.

One or more output components 112 can be provided to present information (e.g., textual, graphical, audible, and/or tactile information) to a user of device 100. Output component 112 can take a variety of forms, including, but not limited to, audio speakers, headphones, signal line-outs, visual displays, antennas, infrared ports, rumblers, vibrators, and any combinations thereof.

It should be noted that one or more input components 110 and/or one or more output components 112 may sometimes be referred to individually or collectively herein as an input/output ("I/O") component or I/O or user interface. It should also be noted that one or more input components 110 and one or more output components 112 may sometimes be combined to provide a single I/O component or user interface, such as a touch screen that may receive input information through a user's touch of a display screen and that may also provide visual information to a user via that same display screen.

Communications circuitry 108 may be provided to allow device 100 to communicate with one or more other electronic devices using any suitable communications protocol. For example, communications circuitry 108 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, and any combinations thereof. Communications circuitry 108 can also include circuitry that enables device 100 to be electrically coupled to another device (e.g., a computer or an accessory device) and communicate with that other device.

Memory 104 may include one or more storage mediums, including, but not limited to, a hard-drive, flash memory, permanent memory such as read-only memory ("ROM"), semi-permanent memory such as random access memory ("RAM"), any other suitable type of storage component, and any combinations thereof. Memory 104 may include cache memory, which may be one or more different types of memory used for temporarily storing data for electronic device applications.

Power supply 106 may provide power to the electronic components of electronic device 100. In some embodiments, power supply 106 can be coupled to a power grid (e.g., when device 100 is not a portable device, such as a desktop computer). In some embodiments, power supply 106 can include one or more batteries for providing power (e.g., when device 100 is a portable device, such as a cellular telephone or a laptop computer). As another example, power supply 106 can be configured to generate power from a natural source (e.g., solar power using solar cells).

Processor 102 of device 100 may control the operation of many functions and other circuitry provided by device 100. For example, processor 102 can receive input signals from input component 110 and/or drive output signals through output component 112. Processor 102 may load a user interface program (e.g., a program stored in memory 104 or on another device or server) to determine how instructions received via input component 110 may manipulate the way in which information (e.g., information stored in memory 104 or on another device or server) is provided to the user via output component 112.

One or more cooling components 118 can be provided to help dissipate heat generated by the various electronic components of electronic device 100. Cooling component 118 may take various forms, including, but not limited to, fans, heat sinks, heat spreaders, heat pipes, vents or openings in housing 101 of electronic device 100, and any combinations thereof.

Housing 101 may at least partially enclose one or more of the various electronic components associated with operating electronic device 100 for protecting them from debris and other degrading forces external to device 100. In some embodiments, housing 101 may typically include several walls that define a cavity within which the various electronic components of device 100 can be disposed. In some embodiments, housing 101 can support various electronic components of device 100, such as input/output ("I/O") components 110 and/or I/O components 112, at the surfaces or within openings through the surfaces of the walls of housing 101.

In some embodiments, one or more of the electronic components of electronic device 100 may be provided within its own housing component (e.g., input component 110 may be an independent keyboard or mouse within its own housing component that may wirelessly or through a wire communicate with processor 102, which may similarly be provided within its own housing component). Housing 101 can be formed from a wide variety of materials including, but not limited to, metals (e.g., steel, copper, titanium, aluminum, and various metal alloys), ceramics, plastics, and any combinations thereof. Housing 101 may also help to define the shape or form of electronic device 100. That is, the contour of housing 101 may embody the outward physical appearance of electronic device 100.

Figure 2:
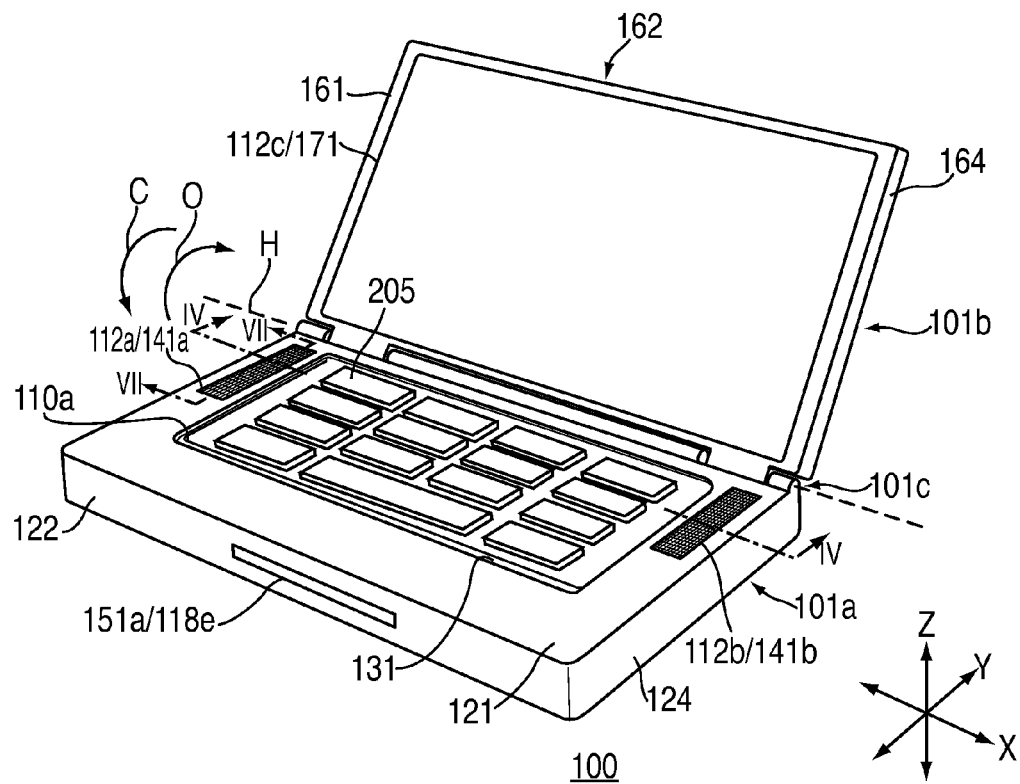
FIG. 2 shows a top, front, right perspective view of the electronic device of FIG. 1 in an open position, according to some embodiments of the invention.
Figure 3:
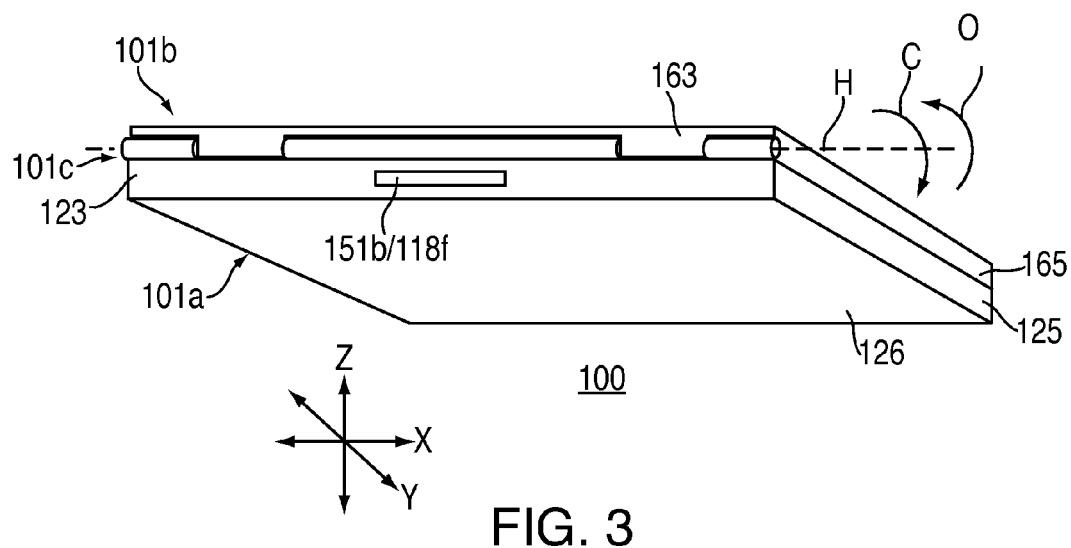
FIG. 3 shows a bottom, back, left perspective view of the electronic device of FIGS. 1 and 2 in a closed position, according to some embodiments of the invention.

Electronic device 100 is illustrated in FIGS. 2-7 to be a laptop computer, although it is to be understood that electronic device 100 may be any type of electronic device as described herein in accordance with the invention. As shown in FIGS. 2 and 3, for example, housing 101 of electronic device 100 may be configured to provide two housing components coupled together by a hinge or clutch assembly. Particularly, housing 101 may include a base housing component 101*a* and a display housing component 101*b* coupled to one another by a hinge assembly 101*c*, also known as clutch assembly 101*c*. Housing components 101*a*, 101*b*, and 101*c* may be configured such that electronic device 100 may be "opened" for use (see, e.g., FIG. 2) by rotating display housing component 101*b* away from base housing component 101*a* in the direction of arrow O about hinge axis H of hinge assembly 101*c*, and such that electronic device 100 may be "closed" (see, e.g., FIG. 3) by rotating display housing component 101*b* towards base housing component 101*a* in the direction of arrow C about hinge axis H. However, it should be noted that housing 101 of device 100 is only exemplary and need not include two substantially hexahedral portions coupled by a hinge. For example, in certain embodiments, the housing of device 100 could generally be formed in any other suitable shape, including, but not limited to, one or more housing components or portions that are substantially spherical, ellipsoidal, conoidal, octahedral, and any combinations thereof.

Figure 4:
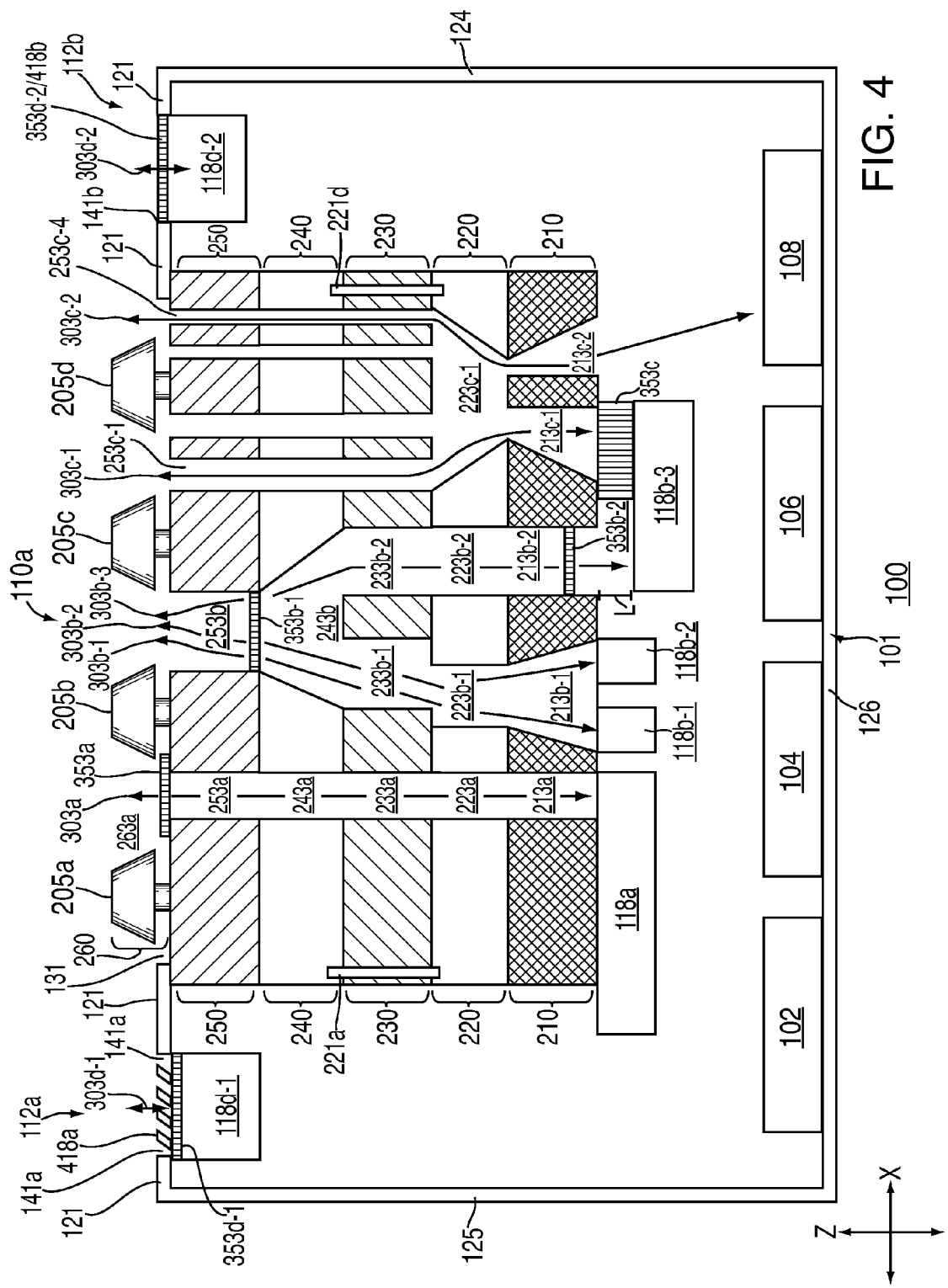
FIG. 4 shows a partial cross-sectional view of a portion of the electronic device of FIGS. 1-3, taken from line IV-IV of FIG. 2, according to some embodiments of the invention.

Base housing component 101a may include a top wall 121, various side walls, such as front wall 122, back wall 123, right wall 124, and left wall 125, and a bottom wall 126 opposite top wall 121. In some embodiments, one or more openings may be provided through one or more of the walls of housing component 101a to at least partially expose one or more components of electronic device 100. For example, as shown in FIGS. 2 and 4, an opening 131 may be provided through top wall 121 of base housing component 101a to at least partially expose an input component 110a of electronic device 100. In some embodiments, as shown in FIGS. 2 and 4, for example, openings 141a and 141b may be provided through top wall 121 of base housing component 101a to at least partially expose respective output components 112a and 112b of electronic device 100. Moreover, as shown in FIGS. 2 and 3, openings 151a and 151b may be respectively provided through front wall 122 and back wall 123 of base housing component 101a to at least partially expose respective cooling components 118e and 118f of electronic device 100.

Likewise, display housing component 101b may include a top wall 161, various side walls, such as front wall 162, back wall 163, right wall 164, and left wall 165, and a bottom wall (not shown) opposite top wall 161. In some embodiments, one or more openings may be provided through one or more of the walls of housing component 101b to at least partially expose one or more components of electronic device 100. For example, as shown in FIG. 2, an opening 171 may be provided through top wall 161 of display housing component 101b to at least partially expose an output component 112c of electronic device 100.

Input component 110a is illustrated in FIGS. 2-6 to be a keyboard, although it is to be understood that input component 110a exposed by opening 131 through top wall 121 of housing component 101a may be any type of input component as described herein in accordance with the invention. Moreover, although output components 112a and 112b are illustrated in FIGS. 2-7 to be audio speakers, it is to be understood that each one of output components 112a and 112b exposed by a respective opening 141 through top wall 121 of housing component 101a may be any type of output component as described herein in accordance with the invention. Similarly, although output component 112c is illustrated in FIG. 2 to be a visual display, it is to be understood that output component 112c exposed by opening 171 through top wall 161 of housing component 101b also may be any type of output component as described herein in accordance with the invention.

Figure 5:
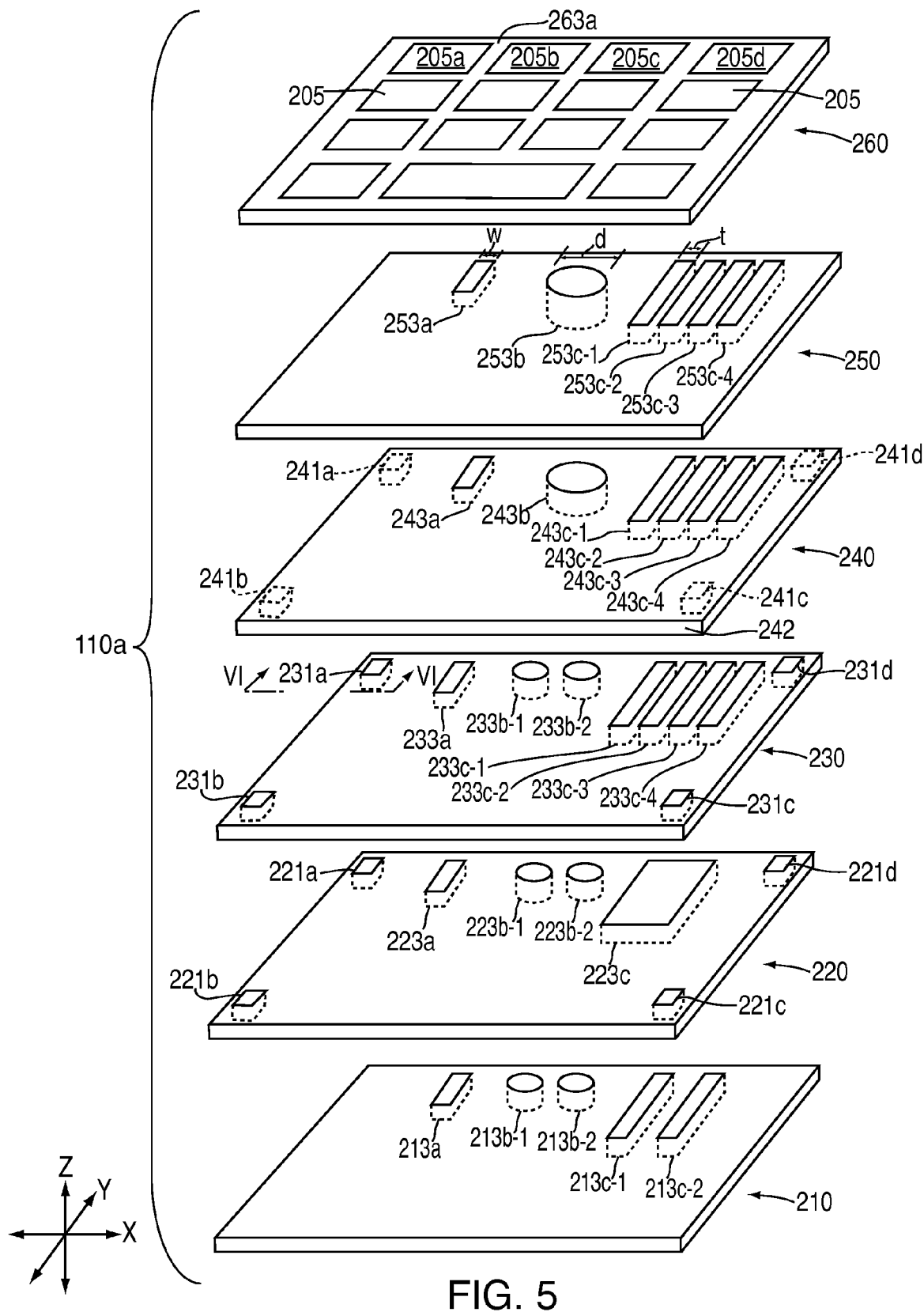
FIG. 5 shows an exploded top, front, right perspective view of a keyboard assembly of the electronic device of FIGS. 1-4, according to some embodiments of the invention.

FIG. 5 shows an exploded perspective view of keyboard assembly input component 110a in accordance with some embodiments of the invention. Keyboard assembly 110a may include base layer 210, flex layer 220, reflector layer 230, light guide layer 240, keyboard membrane layer 250, keypad layer 260, and/or any other suitable layer. Keyboard assembly 110a may also include one or more illumination sources 221. Keyboard assembly 110a may also include one or more flex circuits and voltage sources.

Base layer 210 may at least partially be made of any suitable material for providing structural support to keyboard assembly 110a. For example, base layer 210 may be made of a plastic sheet or a metal sheet, such as a piece of aluminum or stainless steel.

Flex layer 220 may at least partially be made of any suitable material operative to provide support for and/or power to other layers of keyboard assembly 110a. Base layer 210 and flex layer 220 may each be of any suitable thickness and any suitable flexibility. In some embodiments, base layer 210 and flex layer 220 may be combined and provided as a single structural layer of keyboard assembly 110a. One or more illumination sources 221 may be positioned on flex layer 220, but an illumination source 221 may not need to be positioned on flex layer 220 in order to receive power from flex layer 220. An illumination source 221 may be positioned within light guide layer 240, but may still receive power through flex layer 220. Flex layer 220 may also include any suitable logic circuitry to process input signals received by keyboard assembly 110a. In some embodiments, flex layer 220 may provide power and support to illumination sources 221 of keyboard assembly 110a, while an additional flex circuit (not shown) may contain any suitable logic circuitry for processing input signals received by keyboard assembly 110a. The additional flex circuit may form any suitable layer within keyboard assembly 110a.

In some embodiments, flex layer 220 may contain one or more illumination sources 221, such as sources 221a, 221b, 221c, and 221d to provide illumination to keypad layer 260 using any suitable approach. FIG. 5 illustrates one spatial arrangement of multiple illumination sources 221 of flex layer 220. Each illumination source 221 may be the same type of illumination source as or a different type of illumination source from another illumination source 221. Each illumination source 221 may be positioned on flex layer 220, but there may be a corresponding illumination source hole or port 231 in reflector layer 230 and a corresponding illumination source port 241 in light guide layer 240 to allow each illumination source 221 to fit through corresponding illumination source ports 231 and 241 and to emit light from the optical portion of each illumination source 221 into light guide layer 240. For example, illumination source 221a may fit through illumination source port 231a in reflector layer 230 and illumination source port 241a in light guide layer 240 so that the light emitted by illumination source 221a may diffuse through light guide layer 240 (i.e., at least in the X-Y plane of light guide layer 240).

Figure 6:
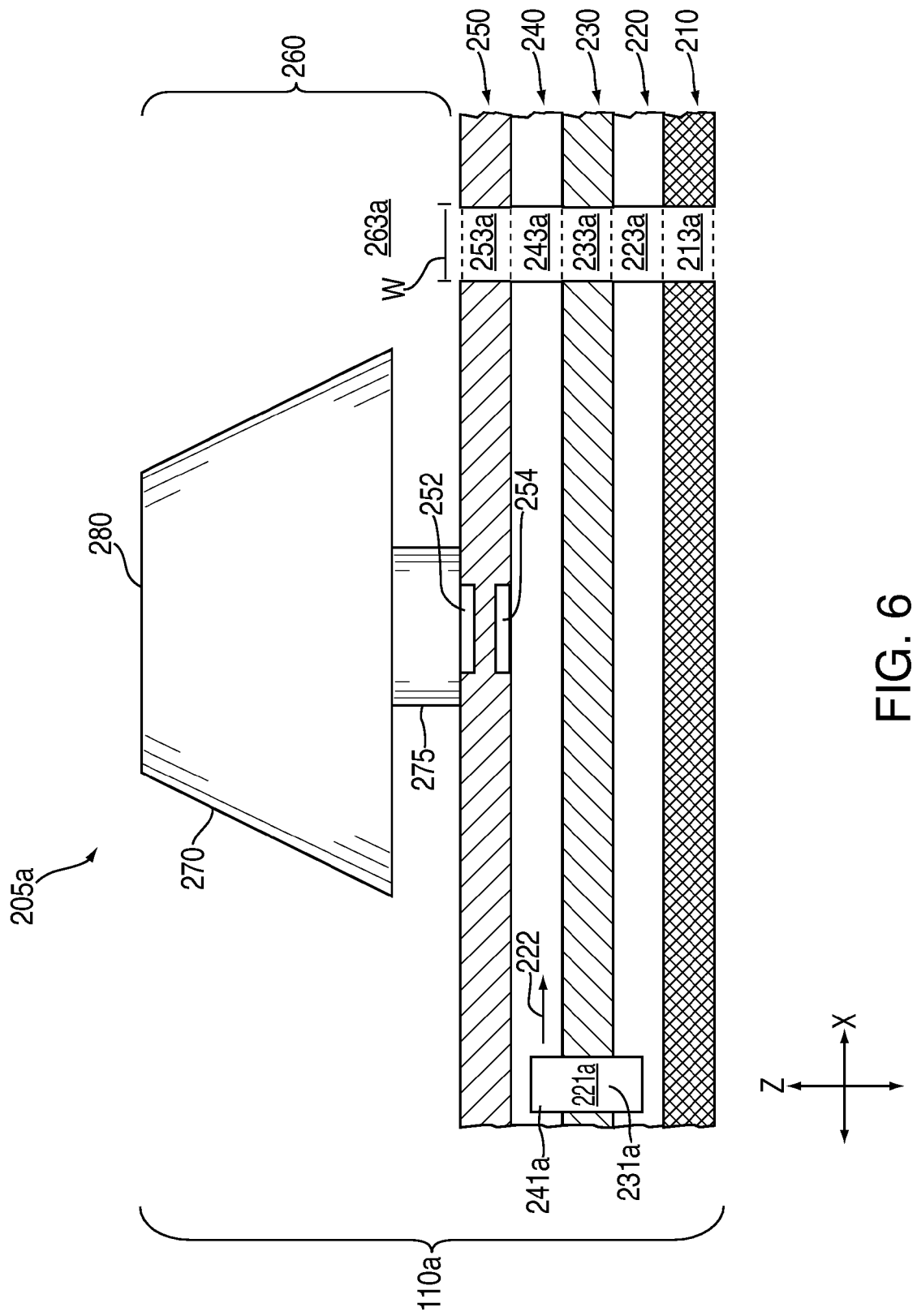
FIG. 6 shows a partial cross-sectional view of a portion of the keyboard assembly of FIGS. 2, 4, and 5, taken from line VI-VI of FIG. 5, according to some embodiments of the invention.

Each illumination source 221 may be positioned anywhere within or on flex layer 220, such that each illumination source 221 may emit light primarily along an axis that may form any suitable angle with an edge 242 of light guide layer 240 within the X-Y plane of light guide layer 240. For example, an illumination source 221 may emit light primarily along an axis that is parallel with edge 242 (e.g., illumination source 221a may emit light in the direction of arrow 222, as shown in FIG. 6). Although, in some embodiments, some light may be emitted upwardly towards keyboard membrane layer 250 and/or downwardly towards reflector layer 230 because an illumination source 221 may emit light in three dimensions (e.g., in the X, Y, and Z directions of FIG. 5). Light that may be diffused through light guide layer 240 by an illumination source 221 may also diffuse upwardly through keyboard membrane layer 250 to illuminate one or more keys 205 of keypad layer 260.

In other embodiments, flex layer 220 may include any illumination source for generally illuminating keyboard assembly 110a. For example, flex layer 220 may include a sheet at least partially made of or coated with a light emitting diode ("LED,") an organic light emitting diode ("OLED,") or an electroluminescent material, or any material that may emit light, for example, if a voltage source is provided.

Reflector layer 230 may at least partially be made of any suitable material for reflecting light emitted within keyboard assembly 110a towards keypad layer 260. If light guide layer 240 is transparent, and if flex layer 220 includes one or more illumination sources 221, then some light emitted from one or more of illumination sources 221 through light guide layer 240 may diffuse downwardly towards reflector layer 230 (e.g., downwardly at least partially in the Z-direction of FIG. 5). Reflector layer 230 may redirect at least some of the diffused light upwardly towards keypad layer 260 to help ensure that keypad layer 260 may be illuminated efficiently without requiring additional illumination sources. Reflector sheet layer 230 may include any suitable number of illumination source ports 231, such as illumination source ports 231a, 231b, 231c, and 231d that may traverse the depth of reflector sheet layer 230 to allow any illumination sources 221 of flex layer 220 to traverse reflector layer 230 and to emit light into light guide layer 240. In other embodiments, keyboard assembly 110a may not include reflector layer 230, and flex layer 220 may be positioned between base layer 210 and light guide layer 240. If reflector layer 230 is not present, then base layer 210 may be at least partially made of any suitable material that is operative to reflect light emitted by one or more illumination sources 221 of flex layer 220 upwardly towards keypad layer 260.

Light guide layer 240 may be at least partially made of any suitable material for diffusing light emitted within keyboard assembly 110a. For example, light guide layer 240 may include a transparent material, such as a flexible clear plastic sheet, that may allow light to travel along its length (i.e., in its X-Y plane). Light guide layer 240 may also allow light to be reflected through it along any suitable path toward keypad layer 260 (e.g., in the Z-direction), the reflection of which may be aided by reflector layer 230.

In some embodiments, light guide layer 240 is present and may include one or more illumination source ports 241, such as illumination source ports 241a, 241b, 241c, and 241d that may or may not traverse the full depth of light guide layer 240, but may allow any illumination source 221 to traverse at least a portion of light guide layer 240 to emit light into light guide layer 240.

Keyboard membrane layer 250 may include any suitable mechanism for receiving any suitable inputs related to keyboard assembly 110a and for transmitting any suitable information to any other suitable device. For example, keyboard membrane layer 250 may contain flex circuitry. Keyboard membrane layer 250 may convert an input from a user that may be received through keypad layer 260 into a signal that may be transmitted to any suitable device, such as the processing circuitry of a desktop computer or any other suitable electronic device using keyboard assembly 110a (e.g., processor 102 of electronic device 100). Keyboard membrane layer 250 may be of any suitable thickness, and may be compressible in response to receiving an input from a user on keypad layer 260. Keyboard membrane layer 250 may also be transparent to allow light emitted from lower layers within keyboard assembly 110a to travel through keyboard membrane layer 250 towards keypad layer 260.

Keypad layer 260 may include any suitable mechanism for receiving user inputs to keyboard assembly 110a. Keypad layer 260 may be at least partially made of any suitable material, such as plastic or metal. Keypad layer 260 may include any suitable arrangement of keys 205 for presentation to a user, and may include any suitable legend scheme in any suitable arrangement to denote each key 205 on keypad layer 260.

FIG. 6 shows a partial cross-sectional view of a portion of keyboard assembly 110a of FIG. 5 that includes individual key 205a in accordance with some embodiments of the invention. Key 205a may form a part of keypad layer 260, and may be mounted above base layer 210, flex layer 220, reflector layer 230, light guide layer 240, and keyboard membrane layer 250. Key 205a may include a striking surface 280, keycap 270, key mount 275, conducting plates 252 and 254, and any other suitable features. Other keys 205 on keypad layer 260 may be the same as or different from key 205a, and may include some or all of the features of key 205a. Key mount 275 may be coupled to the top surface of keyboard membrane layer 250 and to the underside of keycap 270.

Conducting plate 252 may be coupled to the top of keyboard membrane layer 250, underneath key 205a, and conducting plate 254 may be coupled to the bottom of keyboard membrane layer 250. The plates may include or may be coated with any material capable of conducting electricity. When placed in contact with one another, conducting plates 252 and 254 may complete an electrical circuit. For example, if a user strikes key 205a on striking surface 280, key mount 275 may move downward, causing keyboard membrane layer 250 to compress and thereby move conducting plate 252 downwardly. Conducting plate 252 may contact conducting plate 254 as a result of the compression and an electrical circuit may be completed by the contact. The completion of the electrical circuit may generate an electrical keyboard input that keyboard membrane layer 250 may transmit to any suitable device, such as the processor of a desktop computer or a laptop computer associated with keyboard assembly 110a (e.g., processor 102 of electronic device 100), to process the keyboard input.

According to some embodiments of the invention, one or more holes or ports may be provided through one or more portions of an I/O component for providing at least a portion of a passageway between an opening in a housing and a cooling component of an electronic device. For example, one or more ports may be provided through keyboard assembly 110a for providing one or more portions of a cooling passageway 303 extending between opening 131 in housing 101 and a cooling component 118 of electronic device 100.

As shown in FIG. 4, keyboard assembly 110a may be positioned within housing 101 of electronic device 100 such that at least a portion of keypad layer 260 extends through or is at least exposed by housing opening 131 to be accessible to a user of device 100. The remaining portions of keyboard assembly 10a may be contained within housing 101. In some embodiments, keyboard assembly 110a may be positioned with respect to opening 131 of housing 101 such that housing opening 131 may not be exposed to other components of device 100 (e.g., cooling components 118). However, as there may be limited openings provided through housing 101, utilizing the available housing openings for drawing cool air into the device and/or for discharging hot air from the device, for example, may be helpful for managing the internal temperature of the device.

Therefore, one or more ports may be provided through a portion of keyboard assembly 110a positioned between housing opening 131 and other electronic components of device 100 (e.g., a cooling component 118) for providing at least a portion of a passageway between housing opening 131 and the electronic component for cooling electronic device 100. For example, as shown in FIG. 4, one or more cooling ports 213 may be provided through base layer 210 of keyboard assembly 110a, one or more cooling ports 223 may be provided through flex layer 220 of keyboard assembly 110a, one or more cooling ports 233 may be provided through reflector layer 230 of keyboard assembly 110a, one or more cooling ports 243 may be provided through light guide layer 240 of keyboard assembly 110a, and one or more cooling ports 253 may be provided through keyboard membrane layer 250 of keyboard assembly 110a. Moreover, one or more spacings 263 may be provided between two or more keys 205 of keypad layer 260.

In some embodiments, a single cooling port through each of the layers of keyboard assembly 110a may align with one another to form a substantially linear channel through keyboard assembly 110a to provide at least a portion of a substantially linear passageway 303a between housing opening 131 and cooling component 118a (see, e.g., cooling ports 213a, 223a, 233a, 243a, and 253a, as well as spacing 263a provided between keys 205a and 205b of keypad layer 260). By at least partially aligning one or more ports and/or spacings through keyboard assembly 110a with housing opening 131 and cooling component 118a, cooling passageway 303a may be linear and may provide a passageway with the least resistance for fluid (i.e., liquid and/or gas) attempting to travel between opening 131 and cooling component 118a.

In some embodiments, a single cooling port through one portion of an I/O component or user interface may align with two or more cooling ports through an adjacent layer of the I/O component or other portions of the electronic device. This may allow a single cooling port of an I/O component to provide a portion of two or more cooling passageways 303 between housing opening 131 and a cooling component 118. For example, a cooling port 243b through light guide layer 240 may align with two separate cooling ports 233b-1 and 233b-2 through reflector layer 230 to provide for a portion of not only cooling passageway 303b-1 but also cooling passageway 303b-3.

Moreover, in some embodiments, a single cooling port through one portion of an I/O component or user interface may align with two or more cooling components 118. This may allow a single cooling port of an I/O component to provide a portion of two or more cooling passageways 303 between housing opening 131 and two or more cooling components 118. For example, a cooling port 213b-1 through base layer 210 may align with two separate cooling components 118b-1 and 118b-2 to provide for a portion of not only cooling passageway 303b-1 but also cooling passageway 303b-2.

In some embodiments, a single cooling component 118 may align with two or more cooling passageways 303. This may allow a single cooling component 118 to exchange fluids with two or more cooling passageways 303 using two or more cooling ports provided through a portion of an I/O component or user interface. For example, not only may cooling component 118b-3 align with cooling passageway 303b-3 that is exposed to housing opening 131 by cooling port 253b, but cooling component 118b-3 may also align with a cooling passageway 303c-1 that is exposed to housing opening 131 by a cooling port 253c-1.

Similarly, although not shown, it is to be understood that a single cooling port through a portion of an I/O component of device 100 may align with two or more distinct housing openings of housing 101. It is also to be understood that two cooling ports through a user interface and/or other component of an electronic device may only partially align with each other in certain embodiments (see, e.g., cooling port 233b-1 through reflector layer 230 and cooling port 223b-1 through flex layer 220).

It is also to be understood that an I/O component may not be positioned directly adjacent (e.g., may not be in surface to surface contact with) a cooling component in order to provide at least a portion of a cooling passageway between that cooling component and a housing opening. For example, as shown in FIG. 4, keyboard assembly 110a may be spaced apart from cooling component 118b-3 (e.g., by an open distance of length L) and still be able to provide cooling passageway 303b-3 between housing opening 131 and cooling component 118b-3. Moreover, it is also to be understood that one or more cooling ports may be provided through an I/O component to expose a housing opening to other components of an electronic device directly and not necessarily through a cooling component. For example, as shown in FIG. 4, no cooling component 118 may be aligned with a cooling passageway 303c-2 that is exposed to housing opening 131 by cooling ports 253c-4, 243c-4, 233c-4, 223c, and 213c-2 of keyboard assembly 110a. Instead, cooling passageway 303c-2 may allow fluid to be exchanged through keyboard assembly 110a between housing opening 131 and communications circuitry 108 directly, for example, without also having to be exchanged through a cooling component 118.

The geometry of each cooling port through a portion of an I/O component, as well as the geometry of any other portion of a cooling passageway that may allow for fluid to be exchanged between a housing opening and an electronic device component contained within the housing (e.g., a cooling component), may vary depending on the circumstances of its use. For example, the geometry of any cooling port or any other portion of a cooling passageway may be configured to match the geometry of an active portion of an associated cooling component (e.g., the size of a fan included in a cooling component). In some embodiments, the geometry of a portion of a cooling passageway may be configured based on thermal management considerations, such as how much heat is to be dissipated by the cooling passageway.

For example, each cooling port through keyboard assembly 110a that provides a portion of cooling passageway 303a (i.e., cooling ports 253a, 243a, 233a, 223a, and 213a) may each form passageway portions that have rectangular cross-sections of width w (see, e.g., FIGS. 5 and 6). In some embodiments, width w may be in the range of 0.5 millimeters to 1.5 millimeters. In some embodiments, width w may be in the range of 0.7 millimeters to 1.3 millimeters. In some embodiments, width w may be about 1.0 millimeter.

As another example, each cooling port through keyboard assembly 110a that provides a portion of cooling passageway 303b-1 (i.e., cooling ports 253b, 243b, 233b-1, 223b-1, and 213b-1) may each form passageway portions that have circular cross-sections. For example, cooling port 253b may have a circular cross-section with a diameter d (see, e.g., FIG. 5). In some embodiments, diameter d may be in the range of 1.5 millimeters to 2.5 millimeters. In some embodiments, diameter d may be in the range of 1.7 millimeters to 2.3 millimeters. In some embodiments, diameter d may be about 2.0 millimeters.

As yet another example, each cooling port through keyboard assembly 110a that provides a portion of at least one of cooling passageways 303c-1, 303c-2, 303c-3, and 303c-4 may each form passageway portions that have rectangular cross-sections of width t (see, e.g., FIG. 5). For example, cooling ports 253c-1, 253c-2, 253c-3, and 253c-4 may each be configured as having a cross-section shaped as a long and thin rectangular slot, and each of these ports may run parallel to one another through keyboard membrane layer 250. In some embodiments, width t may be in the range of 0.1 millimeters to 0.9 millimeters. In some embodiments, width t may be in the range of 0.3 millimeters to 0.7 millimeters. In some embodiments, width t may be about 0.5 millimeters.

It is to be understood that the size of a cooling port may vary throughout the thickness of the portion of the user interface or other electronic device component through which the cooling port is provided (see, e.g., cooling port 213b-1 of FIG. 4, whose size may increase as it traverses downwardly through base layer 210 in the Z-direction towards cooling components 118*b*-1 and 118*b*-2). It is also to be understood, that the foregoing is just illustrative, and that each portion of each cooling passageway 303 may be formed of any suitable size and shape, including, but not limited to, triangular, rectangular, elliptical, and the like. Moreover, any suitable number of cooling ports may be provided through an I/O component, including just one port, for example. Each cooling port may be separated from other cooling ports by any suitable distance, depending on the size of the I/O component and the cooling requirements of the cooling passageways to which each cooling port contributes.

Although creating cooling passageways between housing openings and cooling components may allow certain fluids (e.g., air) to be drawn into and discharged from an electronic device for helping to manage the internal temperature of the device, these passageways may also allow other fluids (e.g., water or any other liquid) to be drawn into the device that may damage some of the internal components of the device. Therefore, in some embodiments of the invention, one or more filters may be positioned within a cooling passageway for protecting the device or the user from harmful fluids (e.g., liquids) that may otherwise travel freely through the passageway.

For example, as shown in FIG. 4, one or more filters 353 may be positioned within one or more cooling passageways 303. In some embodiments, a single filter may be positioned within a cooling passageway between a housing opening and an I/O component or user interface. This may allow the filter to be accessible to a user of the device for cleaning or replacement of the filter. For example, a filter 353*a* may be positioned within cooling passageway 303*a* between housing opening 131 and cooling port 253*a* provided through keyboard membrane layer 250 of keyboard assembly 110*a*.

In some embodiments, a filter may be positioned between two or more aligned cooling ports through an I/O component or user interface that provide at least a portion of one or more cooling passageways. This may allow the filter to be positioned during the manufacture of the I/O component. For example, a filter 353*b*-1 may be positioned within keyboard assembly 110*a* between keyboard membrane layer 250 and light guide layer 240 such that filter 353*b*-1 is positioned not only within cooling passageway 303*b*-1, but also cooling passageways 303*b*-2 and 303*b*-3.

In some embodiments, a filter may be positioned within a cooling port through an I/O component or user interface that provides at least a portion of one or more cooling passageways. This may allow the filter to be positioned after the manufacture of the I/O component. For example, a filter 353*b*-2 may be positioned or inserted within cooling port 213*b*-2 provided through base layer 210 of keyboard assembly 110*a* such that filter 353*b*-2 is positioned within cooling passageway 303*b*-3.

Moreover, in some embodiments, a single filter may be positioned within a cooling passageway between a cooling component and an I/O component or user interface. This may allow the filter to be positioned after the manufacture of the I/O component. For example, a filter 353*c* may be positioned within cooling passageway 303*c*-1 between cooling component 118*b*-3 and keyboard assembly 110*a*.

Each filter 353 may be configured not only to allow certain fluids to pass through the filter but also to prevent other certain fluids from passing through the filter. For example, filter 353 may include a hydrophobic material that can allow air and other similar gasses to travel through the filter but not water or other similar liquids.

Figure 7:
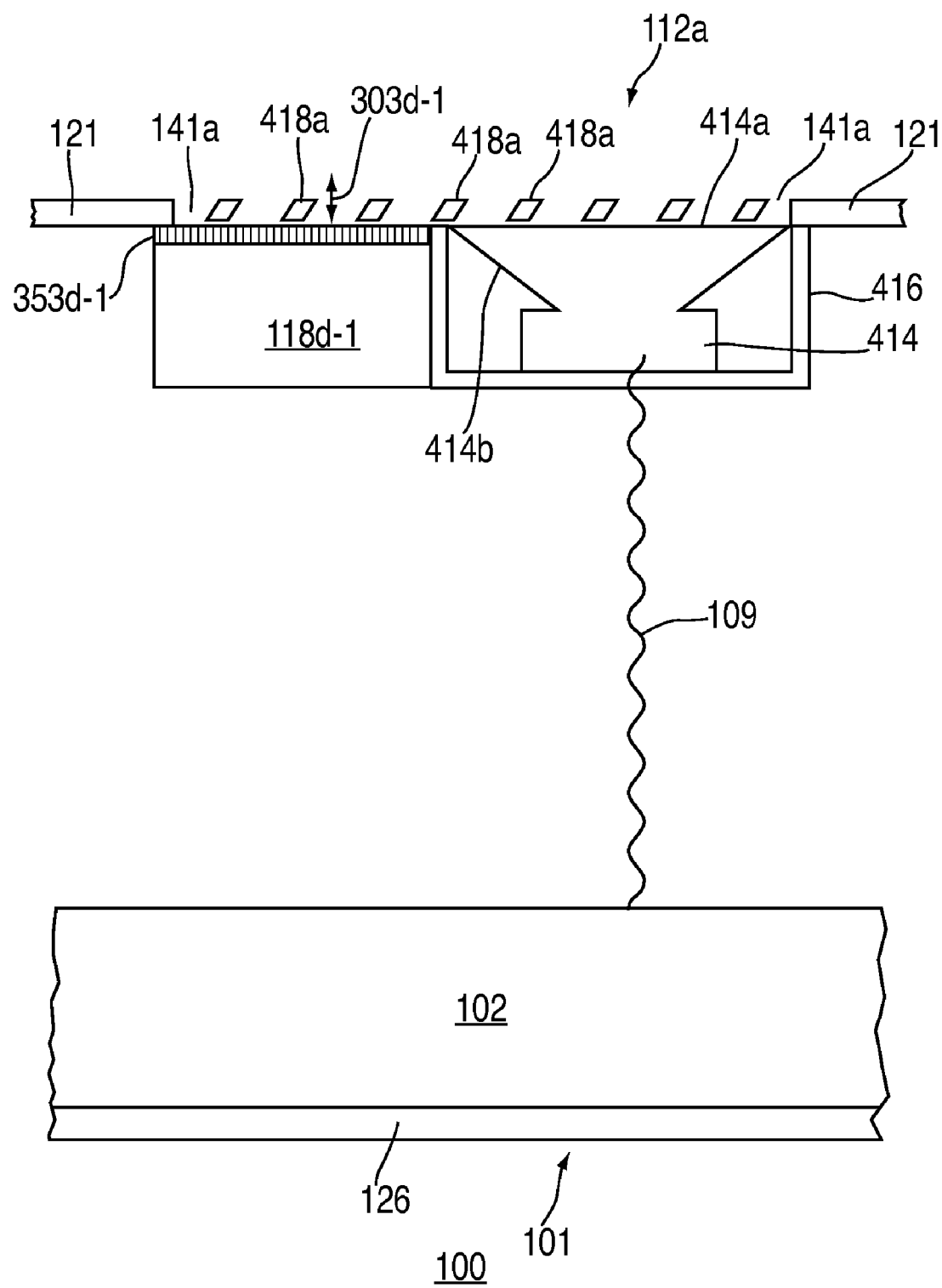
FIG. 7 shows a partial cross-sectional view of a portion of the electronic device of FIGS. 1-4, taken from line VII-VII of FIG. 2, according to some embodiments of the invention.

Besides keyboard assemblies, one or more cooling passageways 303 may also be provided through any other type of I/O component or user interface. For example, one or more cooling passageways may be provided through audio speaker output components 112*a* and 112*b*. As shown in FIG. 7, for example, audio speaker output component 112*a* may include an electromechanical transducer or driver 414 and a cabinet or enclosure 416. Driver 414 may be able to convert an electrical signal into sound (e.g., an electrical signal provided to driver 414 from processor 102 via bus 109). Driver 414 may be mounted in cabinet 416 and cabinet 416 may prevent sound waves from the back of driver 414 from interfering with sound waves from the front of driver 414 (e.g., a sealed cabinet 416 may prevent transmissions from rear 414*b* of driver 414 from interfering with transmissions from front 414*a* of driver 414).

Audio speaker output component 112*a* may be positioned within housing 101 of electronic device 100 such that at least a portion of front 414*a* of driver 414 extends through or is at least exposed by housing opening 141*a* to be accessible to a user of device 100. Audio speaker output component 112*a* may also include a speaker grill 418*a* that may be provided between driver 414 and housing opening 141*a* to protect front 414*a* of driver 414 from being punctured or otherwise damaged by a user or other dangers external to housing 101.

As mentioned, because there may be limited openings provided through housing 101, utilizing the available housing openings for drawing cool air into the device and/or for discharging hot air from the device, for example, may be helpful for managing the internal temperature of the device. Therefore, a portion of audio speaker output component 112*a* may be used to provide a cooling passageway between housing opening 141*a* and a cooling component or other electronic component of electronic device 100. For example, as shown in FIGS. 4 and 7, one or more spacings in grill 418*a* of audio speaker output component 112*a* may provide at least a portion of a cooling passageway 303*d*-1 between housing opening 141*a* and a cooling component 118*d*-1.

In some embodiments, a filter 353*d*-1 may be positioned within cooling passageway 303*d*-1 between grill 418*a* of audio speaker output component 112*a* and cooling component 118*d*-1. This may allow filter 353*d*-1 to be positioned after the manufacture of audio speaker output component 112*a*.

Audio speaker output component 112*b* may be constructed and positioned within housing 101 similarly to audio speaker output component 112*a*, such that a portion of audio speaker output component 112*b* may be used to provide a cooling passageway between housing opening 141*b* and a cooling component or other component of electronic device 100. For example, as shown in FIG. 4, a grill 418*b* of audio speaker output component 112*b* may provide at least a portion of a cooling passageway 303*d*-2 between housing opening 141*b* and a cooling component 118*d*-2. In this embodiment, however, a filter 353*d*-2 may be used not only to filter fluids passing through the filter but also to provide grill 418*b* for protecting the front of the driver of audio speaker output component 112*b* (not shown) from being punctured or otherwise damaged by a user or other dangers external to housing 101.

Each cooling passageway 303 of electronic device 100 may allow fluids to be exchanged between one or more openings in housing 101 and one or more electronic components contained within housing 101, such as cooling components 118 or processor 102. Fluids drawn through a cooling passageway 303 from a housing opening into housing 101 may be directed towards components within housing 101 that need to be cooled, such as processor 102. A cooling component 118 may be a fan configured to draw air through a cooling passageway 303 from a housing opening and to blow that drawn air over portions of processor 102 that may be hot and in need of cooling. Alternatively, fluids may be discharged from within housing 101 through a cooling passageway 303 and a housing opening for removing hot fluids from electronic device 100. In some embodiments, a cooling component 118 may be in direct communication with a housing opening and may not need to utilize a cooling passageway that is at least partially provided through an I/O component (see, e.g., cooling component 118e and housing opening 151a of FIG. 2 as well as cooling component 118f and housing opening 151b of FIG. 3).

While there have been described methods and apparatus for cooling an electronic device through a user interface of the electronic device, it is to be understood that many changes may be made therein without departing from the spirit and scope of the invention. It is also to be understood that various directional and orientational terms such as "front" and "back" and "rear," "left" and "right," "top" and "bottom," "side" and "edge" and "corner," "up" and "down," "thickness" and "width," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention. Those skilled in the art will appreciate that the invention can be practiced by other than the described embodiments, which are presented for purposes of illustration rather than of limitation, and the invention is limited only by the claims which follow.

What is claimed is:

1. An electronic device comprising:
   a housing having a housing opening;
   a cooling component at least partially contained within the housing; and
   an input/output ("I/O") component at least partially contained within the housing, wherein the I/O component includes:
      a first layer having a first port through a first portion of the first layer; and
      a second layer having a second port through a first portion of the second layer, wherein the first port is at least partially aligned with the second port, wherein the first port provides a first portion of a passageway for fluid communication between the housing opening and the cooling component, and wherein the second port provides a second portion of the passageway.

2. The electronic device of claim 1 further comprising within the passageway a filter for passing a gas but not a liquid.

3. The electronic device of claim 2, wherein the filter is positioned within the first port.

4. The electronic device of claim 2, wherein the filter is positioned between the first port and the cooling component.

5. The electronic device of claim 2, wherein the filter includes a hydrophobic material.

6. The electronic device of claim 1, wherein the cooling component is configured to discharge a fluid through the passageway and to the housing opening.

7. The electronic device of claim 1, wherein the cooling component is configured to draw a fluid through the passageway from the housing opening.

8. The electronic device of claim 1, wherein the cooling component includes a fan.

9. The electronic device of claim 1, wherein the I/O component is a keyboard assembly.

10. The electronic device of claim 9, wherein:
    the keyboard assembly further includes a plurality of keys;
    the first layer is a light guide layer positioned under the plurality of keys; and
    the second layer is a base layer positioned under the light guide layer.

11. The electronic device of claim 10, wherein the keyboard assembly further includes a flex layer positioned between the plurality of keys and the base layer, and wherein the I/O component further includes a third port through at least a portion of the flex layer for providing a third portion of the passageway.

12. The electronic device of claim 9, wherein:
    the keyboard assembly further comprises:
       a keypad comprising at least a first key and a second key;
       a keyboard membrane layer positioned under the keypad and having a keyboard membrane port through the keyboard membrane layer that is at least partially aligned with a spacing between the first key and the second key;
       a light guide layer positioned under the keyboard membrane layer and having a light guide port through the light guide layer that is at least partially aligned with the keyboard membrane port; and
       a reflector layer positioned under the light guide layer and having a reflector port through the reflector layer that is at least partially aligned with the light guide port;
    the first layer is a flex layer positioned under the reflector layer;
    the first port is at least partially aligned with the reflector port; and
    the second layer is a base layer positioned under the flex layer.

13. The electronic device of claim 1, wherein the first port is completely aligned with the second port.

14. The electronic device of claim 1, wherein the first port provides a first portion of another passageway.

15. The electronic device of claim 1, wherein the second layer further comprises a third port through a second portion of the second layer, and wherein the first port is at least partially aligned with the third port.

16. The electronic device of claim 15 further comprising a second cooling component at least partially within the housing, wherein the first port provides a first portion of a second passageway between the housing opening and the second cooling component, and wherein the third port provides a second portion of the second passageway.

17. The electronic device of claim 1, wherein the I/O component is positioned directly adjacent the cooling component.

18. The electronic device of claim 17, wherein a surface of the I/O component contacts a surface of the cooling component.

19. The electronic device of claim 1, wherein a geometry of the second port may match a geometry of the cooling component.

20. The electronic device of claim 1, wherein a cross-section of the second port may match a cross-section of an active portion of the cooling component.

21. The electronic device of claim 1, wherein the second layer is positioned under the first layer.

22. The electronic device of claim 1, wherein the first port and the second port form at least a portion of a linear channel through the I/O component.

23. The electronic device of claim 1, wherein the passageway is a linear passageway.

24. A method of manufacturing an electronic device, the method comprising:

provpiding an opening in a surface of a housing;

providing a user interface component comprising a first layer with a first port through the first layer and a second layer with a second port through the second layer; and positioning a cooling component and the user interface component within the housing such that the first port and the second port are at least partially aligned and provide at least a portion of an airflow passageway between the opening and the cooling component.

\* \* \* \* \*

UNITED STATES PATENT AND TRADEMARK OFFICE
CERTIFICATE OF CORRECTION

PATENT NO. : 7,911,780 B2
APPLICATION NO. : 12/241009
DATED : March 22, 2011
INVENTOR(S) : Ihab A. Ali et al.

Page 1 of 1

It is certified that error appears in the above-identified patent and that said Letters Patent is hereby corrected as shown below:

In the Specification:

In column 8, line 43, delete "10a" and insert -- 110a --, therefor.

Signed and Sealed this
Twenty-ninth Day of November, 2011

David J. Kappos
*Director of the United States Patent and Trademark Office*